US007961709B2

(12) United States Patent
Lindoff et al.

(10) Patent No.: US 7,961,709 B2
(45) Date of Patent: Jun. 14, 2011

(54) SECONDARY SYNCHRONIZATION SEQUENCES FOR CELL GROUP DETECTION IN A CELLULAR COMMUNICATIONS SYSTEM

(75) Inventors: Bengt Lindoff, Bjärred (SE); Robert Baldemair, Solna (SE); Erik Dahlman, Bromma (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 147 days.

(21) Appl. No.: 12/522,166

(22) PCT Filed: Dec. 7, 2007

(86) PCT No.: PCT/EP2007/063493
§ 371 (c)(1),
(2), (4) Date: Aug. 28, 2009

(87) PCT Pub. No.: WO2008/083886
PCT Pub. Date: Jul. 17, 2008

(65) Prior Publication Data
US 2009/0323629 A1 Dec. 31, 2009

Related U.S. Application Data

(60) Provisional application No. 60/883,898, filed on Jan. 8, 2007.

(51) Int. Cl.
*H04J 3/06* (2006.01)
(52) U.S. Cl. ......... 370/350; 370/509; 455/502; 455/525
(58) Field of Classification Search .......... 370/203–210, 370/304, 324, 335, 337, 342, 350, 395.62, 370/503–514, 520; 455/13.2, 67.16, 208–209, 455/255, 265, 434, 446, 501, 502, 517, 524, 525; 375/145, 149, 356, 365–368
See application file for complete search history.

(56) References Cited

U.S. PATENT DOCUMENTS

| 7,596,105 | B2 * | 9/2009 | Sezgin et al. | 370/280 |
| 7,693,123 | B2 * | 4/2010 | Rudolf | 370/342 |
| 7,808,967 | B2 * | 10/2010 | Han et al. | 370/350 |
| 2007/0064642 | A1 * | 3/2007 | Watabe et al. | 370/324 |
| 2007/0116166 | A1 * | 5/2007 | Parts et al. | 375/354 |
| 2008/0043702 | A1 * | 2/2008 | Moon et al. | 370/342 |
| 2008/0181194 | A1 * | 7/2008 | Lindoff et al. | 370/350 |
| 2008/0205375 | A1 * | 8/2008 | Onggosanusi et al. | 370/350 |

(Continued)

OTHER PUBLICATIONS

PCT International Search Report, dated Jun. 10, 2008, in connection with International Application No. PCT/EP2007/063493.

(Continued)

*Primary Examiner* — Aung S Moe
*Assistant Examiner* — Habte Mered

(57) ABSTRACT

Timing parameters and an identity of a particular one of a number of cell groups are indicated in a signal transmitted in a cellular communication system having a radio frame in a physical layer, the radio frame comprising a number of time slots. In a known one of the time slots, a synchronization signal, $S_1$, is transmitted that comprises a pair of sequences arranged in a first ordering. In another known one of the time slots, a synchronization signal, $S_2$, is transmitted that comprises a pair of sequences arranged in a second ordering. The selected pair of sequences is uniquely identified with the particular cell group, and the first ordering of the sequences is used only for transmission in the known one of the time slots, and the second ordering of the sequences is used only for transmission in said another known one of the time slots.

31 Claims, 6 Drawing Sheets

U.S. PATENT DOCUMENTS

| | | | |
|---|---|---|---|
| 2008/0291892 A1* | 11/2008 | Luo ............................... | 370/350 |
| 2009/0268602 A1* | 10/2009 | Han et al. ....................... | 370/208 |
| 2010/0103906 A1* | 4/2010 | Montojo et al. ............... | 370/335 |
| 2010/0182979 A1* | 7/2010 | Malladi et al. ................. | 370/336 |
| 2010/0226334 A1* | 9/2010 | Ma et al. ......................... | 370/329 |
| 2010/0246525 A1* | 9/2010 | Parts et al. ..................... | 370/329 |
| 2011/0002430 A1* | 1/2011 | Kim et al. ...................... | 375/362 |

OTHER PUBLICATIONS

PCT International Preliminary Report on Patentability, dated Mar. 31, 2009, in connection with International Application No. PCT/EP2007/063493.

"Outcome of cell search drafting session" TSG-RAN WG1 #46BIS, Seoul, Korea, No. R1-062990, Oct. 9, 2006, XP002478821.

Fujitsu: "Views on SCH structure" 3GPP. Org, TSG-RAN WG1, No. R1-063342, Nov. 6, 2006, XP007904836. Riga Latvia. Retrieved from the Internet: URL: http://www.3gpp.org/ftp/tsg_ran/WG1_RL1/TSGR1_47/Docs/R1-063342.zip.

Wang, Yi-Pin Eric et al: "Cell Search in W-CDMA" IEEE Journal on Selected Areas in Communications, IEEE Service Center, Piscataway, US, vol. 18, No. 8, Aug. 1, 2000, XP011055194, ISSN: 0733-8716.

* cited by examiner

SECONDARY SYNCHRONIZATION SEQUENCES FOR CELL GROUP DETECTION IN A CELLULAR COMMUNICATIONS SYSTEM

CROSS-REFERENCE TO RELATED APPLICATIONS

This application claims the benefit of U.S. Provisional Application No. 60/883,898, filed Jan. 8, 2007, which is hereby incorporated herein by reference in its entirety.

BACKGROUND

The present invention relates to methods and apparatuses for identifying cells in a cellular communication system.

In the forthcoming evolution of the mobile cellular standards like the Global System for Mobile Communication (GSM) and Wideband Code Division Multiple Access (WCDMA), new transmission techniques like Orthogonal Frequency Division Multiplexing (OFDM) are likely to occur. Furthermore, in order to have a smooth migration from the existing cellular systems to the new high capacity high data rate system in existing radio spectrum, a new system has to be able to utilize a bandwidth of varying size. A proposal for such a new flexible cellular system, called Third Generation Long Term Evolution (3G LTE), can be seen as an evolution of the 3G WCDMA standard. This system will use OFDM as the multiple access technique (called OFDMA) in the downlink and will be able to operate on bandwidths ranging from 1.25 MHz to 20 MHz. Furthermore, data rates up to 100 Mb/s will be supported for the largest bandwidth. However, it is expected that 3G LTE will be used not only for high rate services, but also for low rate services like voice. Since 3G LTE is designed for Transmission Control Protocol/Internet Protocol (TCP/IP), Voice over IP (VoIP) will likely be the service that carries speech.

The physical layer of a 3G LTE system includes a generic radio frame having a duration of 10 ms. FIG. 1 illustrates one such frame 100. Each frame has 20 slots (numbered 0 through 19), each slot having a duration of 0.5 ms. A sub-frame is made up of two adjacent slots, and therefore has a duration of 1 ms.

One important aspect of LTE is the mobility function. Hence, synchronization symbols and cell search procedures are of major importance in order for the User Equipment (UE) to detect and synchronize with other cells. To facilitate cell search and synchronization procedures, defined signals include primary and secondary synchronization signals (P-SyS and S-SyS, respectively), which are transmitted on a Primary Synchronization Channel (P-SCH) and a Secondary Synchronization Channel (S-SCH), respectively. The P-SySs and S-SySs are each broadcast twice per frame: once in sub-frame 0, and again in sub-frame 5, as shown in FIG. 1.

The currently proposed cell search scheme for LTE is as follows:

1. Detect one out of three possible P-SyS symbols, thereby indicating the 5 ms timing and the cell ID within a currently unknown cell group.
2. Detect frame timing and cell group using the S-SyS. This in combination with the results from step 1 gives an indication of the full cell ID.
3. Use the reference symbols (also called CQI pilots) to detect the cell ID. The interested reader is referred to the document R1-062990, entitled "Outcome of cell search drafting session", TSG-RAN WG1 #46bis, Oct. 9-13, 2006 for more information about this proposal.
4. Read the Broadcast Channel (BCH) to receive cell-specific system information.

The SyS signals transmitted on the S-SCH are constructed as a pair of sequences, S1, S2 (see FIG. 1). The sequences are defined in the frequency domain. The signals to be transmitted on the S-SCH should be constructed such that the SyS pair S1, S2 should uniquely define the cell group and 10 ms frame timing once detected by the UE such that the cell group pn-sequence is detected and the UE can start the verification step (stage 3) of the above-described process (i.e., verification of the cell ID detected from stage 1 and stage 2 processing).

Furthermore, in order to minimize interruption time when performing Inter-frequency and Inter-Radio Access Technology (InterRAT) measurements, it is desirable that it also be possible to detect the cell group using only one SyS (i.e., S1 or S2 alone).

Consequently, there is a need for an S-SyS sequence design that will satisfy both requirements.

SUMMARY

It should be emphasized that the terms "comprises" and "comprising", when used in this specification, are taken to specify the presence of stated features, integers, steps or components; but the use of these terms does not preclude the presence or addition of one or more other features, integers, steps, components or groups thereof.

In accordance with one aspect of the present invention, the foregoing and other objects are achieved in a methods and apparatuses that indicate timing parameters and an identity of a particular cell group from a number, M, of possible cell groups in a signal transmitted in a cellular communication system that employs a radio frame in a physical layer, the radio frame comprising a number of time slots. Indicating these parameters involves transmitting, in a known one of the time slots of the radio frame, a synchronization signal, $S_1$, that comprises a pair of sequences, $\tilde{S}_i, \tilde{S}_j$ arranged in a first ordering; and transmitting, in another known one of the time slots of the radio frame, a synchronization signal, $S_2$, that comprises the pair of sequences, $\tilde{S}_i, \tilde{S}_j$ arranged in a second ordering, wherein:

each member of the pair of sequences, $\tilde{S}_i, \tilde{S}_j$, is selected from a group comprising at least $$N_{Seq} = \text{ceil}\left(\frac{1 + \sqrt{1 + 8M}}{2}\right)$$

different sequences; and the selected pair of sequences is uniquely identified with the particular cell group, wherein i, j∈[1, ..., $N_{Seq}$] and $\tilde{S}_i \neq \tilde{S}_j$.

The first ordering of the sequences is used only for transmission in the known one of the time slots of the radio frame, and the second ordering of the sequences is used only for transmission in said another known one of the time slots. Consequently, detection of the ordering of just one pair of sequences can be used by a receiver as a time slot identifier, which in turn allows radio frame timing to be determined.

In some embodiments, the first ordering of the pair of sequences, $\tilde{S}_i, \tilde{S}_j$ is effected by transmitting the sequence $\tilde{S}_i$ before transmitting the sequence $\tilde{S}_j$; and the second ordering of the pair of sequences, $\tilde{S}_i, \tilde{S}_j$ is effected by transmitting the sequence $\tilde{S}_j$ before transmitting the sequence $\tilde{S}_i$. In such cases, $S_1$ and $S_2$ can each be of length n, and each of the sequences $\tilde{S}_i, \tilde{S}_j$ can be of length n/2.

In alternative embodiments, in which the physical layer of the cellular communication system employs Orthogonal Frequency Division Multiplexing, the first ordering of the pair of sequences, $\tilde{S}_i, \tilde{S}_j$ is effected by transmitting the sequence $\tilde{S}_i$ on a first set of one or more sub-carriers, and transmitting the sequence $\tilde{S}_j$ on a second set of one or more sub-carriers. Conversely, the second ordering of the pair of sequences, $\tilde{S}_i, \tilde{S}_j$ is effected by transmitting the sequence $\tilde{S}_j$ on the first set of one or more sub-carriers, and transmitting the sequence $\tilde{S}_i$ on the second set of one or more sub-carriers.

In yet other alternative embodiments, ordering of the pair of sequences can be effected by generating the synchronization signals $S_1$ and $S_2$ in accordance with:

$$S_1 = \alpha \tilde{S}_i + \beta \tilde{S}_j; \text{ and}$$

$$S_2 = \beta \tilde{S}_i + \alpha \tilde{S}_j,$$

wherein:
  $\alpha$ is a first multiplicand;
  $\beta$ is a second multiplicand, $\alpha \neq \beta$.

Each of the multiplicands, $\alpha$ and $\beta$, can for example be a scalar value and correspond to an amount of signal amplitude. Alternatively, each of the multiplicands, $\alpha$ and $\beta$, can correspond to an amount of signal power.

In some such embodiments, the synchronization signals $S_1$ and $S_2$ and the sequences $\tilde{S}_i$ and $\tilde{S}_j$ can all be of equal length.

In some variants of such embodiments, transmitting the synchronization signal $S_1$ comprises transmitting $\alpha \tilde{S}_i$ and $\beta \tilde{S}_j$ simultaneously; and transmitting the synchronization signal $S_2$ comprises transmitting $\beta \tilde{S}_i$ and $\alpha \tilde{S}_j$ and simultaneously.

Various aspects of the invention are also reflected on the receiver side of the communication system, in which methods and apparatuses are provided that detect timing parameters and an identity of a particular cell group from a number, M, of possible cell groups in a signal received in a cellular communication system that employs a radio frame in a physical layer, the radio frame comprising a number of time slots including two time slots associated with a synchronization channel. Such detection includes receiving, in one of the time slots associated with the synchronization channel, one of first and second synchronization signals, $S_1$ and $S_2$, wherein the first synchronization signal $S_1$ comprises a pair of sequences, $\tilde{S}_i, \tilde{S}_j$ arranged in a first ordering and the second synchronization signal $S_2$ comprises the pair of sequences, $\tilde{S}_i, \tilde{S}_j$ arranged in a second ordering. It is then determined which of a number of predefined sequences best matches the received sequence $\tilde{S}_i$, which of the number of predefined sequences best matches the received sequence $\tilde{S}_j$, and whether the pair of received sequences $\tilde{S}_i, \tilde{S}_j$ were arranged in the first ordering or the second ordering, wherein the number of predefined sequences is selected from a group comprising at least $$N_{Seq} = \text{ceil}\left(\frac{1 + \sqrt{1 + 8M}}{2}\right)$$

different sequences.

The particular cell group is identified by performing a cell group identification process that includes determining with which cell group the pair of received sequences, $\tilde{S}_i, \tilde{S}_j$, is uniquely associated. It is also determined in which one of the two time slots associated with the synchronization channel the one of first and second synchronization signals was received by using information that indicates whether the sequences $\tilde{S}_i, \tilde{S}_j$ were received in the first ordering or the second ordering.

In yet another aspect, identifying the particular cell group by determining with which cell group the pair of received sequences, $\tilde{S}_i, \tilde{S}_j$, is uniquely associated comprises using the pair of received sequences $\tilde{S}_i, \tilde{S}_j$ to locate an entry in a look-up table.

In still another aspect, using information about whether the sequences $\tilde{S}_i, \tilde{S}_j$ were arranged in the first ordering or the second ordering to determine in which one of the two time slots associated with the synchronization channel the received one of the first and second synchronization signals was received comprises using the pair of received sequences $\tilde{S}_i, \tilde{S}_j$ to locate an entry in a look-up table.

In another aspect, whether to rely on just one or both of the received synchronization signals can be made dependent on the type of cell search being performed. For example, such embodiments can include receiving, in an other one of the time slots associated with the synchronization channel, an other one of the first and second synchronization signals. It is then determined whether a type of cell search procedure to be performed is an inter-frequency cell search procedure, an inter-radio access technology cell search procedure, or an intra-cell search procedure. If the type of cell search procedure to be performed is none of these, then it is determined which of the number of predefined sequences best matches the received sequence $\tilde{S}_i$ of the other one of the first and second synchronization signals, which of the number of predefined sequences best matches the received sequence $\tilde{S}_j$ of the other one of the first and second synchronization signals, and whether the pair of received sequences $\tilde{S}_i, \tilde{S}_j$ of the other one of the first and second synchronization signals were arranged in the first ordering or the second ordering. In such cases, the cell group identification process further includes determining with which cell group the pair of received sequences, $\tilde{S}_i, \tilde{S}_j$, of the other one of the first and second synchronization signals is uniquely associated.

BRIEF DESCRIPTION OF THE DRAWINGS

The objects and advantages of the invention will be understood by reading the following detailed description in conjunction with the drawings in which.

DETAILED DESCRIPTION

Figure 1:
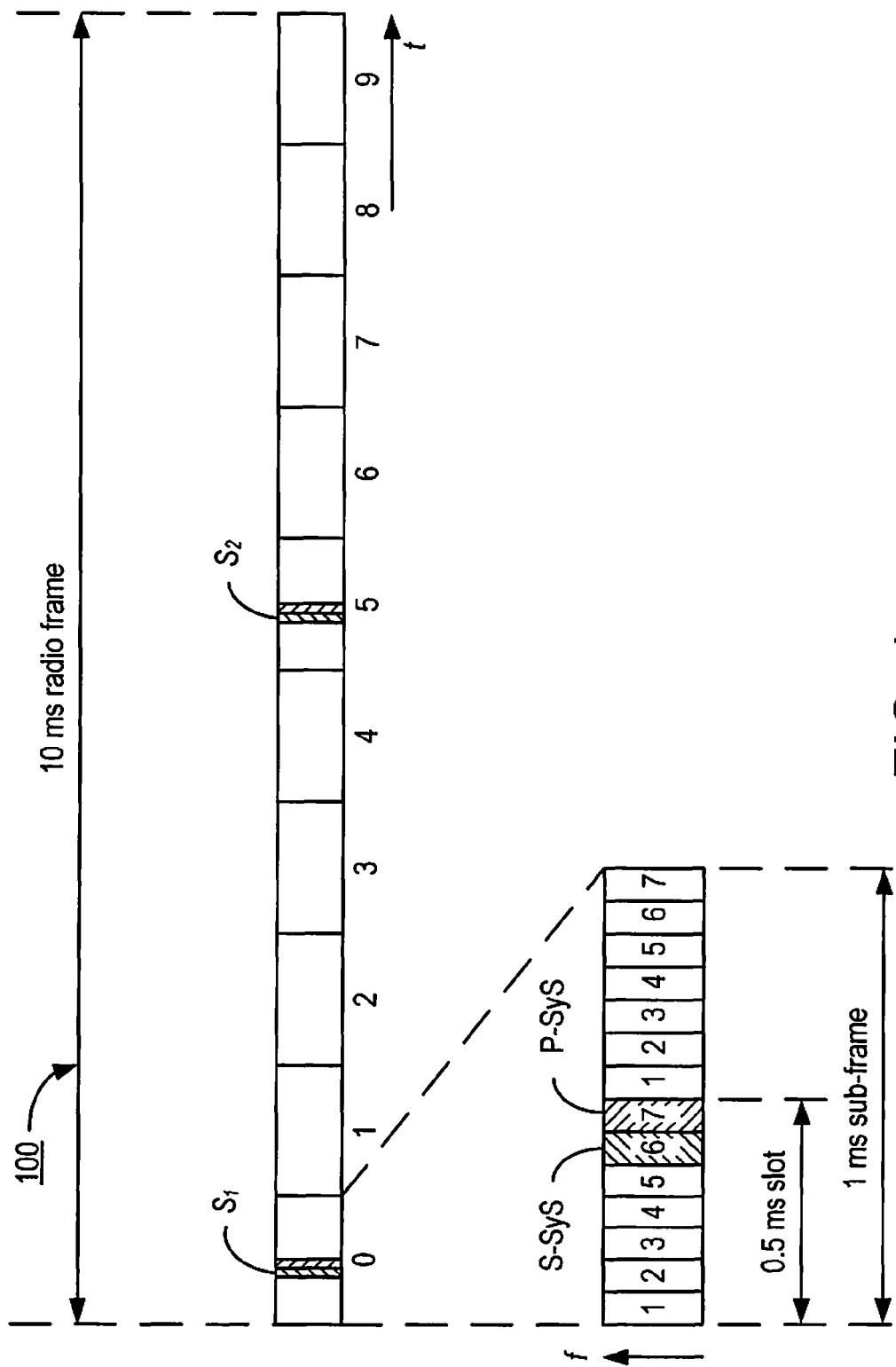
FIG. 1 is an exemplary radio frame suitable for communications systems like the 3G LTE system.

The various features of the invention will now be described with reference to the figures, in which like parts are identified with the same reference characters.

The various aspects of the invention will now be described in greater detail in connection with a number of exemplary embodiments. To facilitate an understanding of the invention, many aspects of the invention are described in terms of sequences of actions to be performed by elements of a computer system or other hardware capable of executing programmed instructions. It will be recognized that in each of the embodiments, the various actions could be performed by specialized circuits (e.g., discrete logic gates interconnected to perform a specialized function), by program instructions being executed by one or more processors, or by a combination of both. Moreover, the invention can additionally be considered to be embodied entirely within any form of computer readable carrier, such as solid-state memory, magnetic disk, or optical disk containing an appropriate set of computer instructions that would cause a processor to carry out the techniques described herein. Thus, the various aspects of the invention may be embodied in many different forms, and all such forms are contemplated to be within the scope of the invention. For each of the various aspects of the invention, any such form of embodiments may be referred to herein as "logic configured to" perform a described action, or alternatively as "logic that" performs a described action.

An aspect of embodiments consistent with the invention is the provision of a minimum amount of S-SyS sequences needed to satisfy the requirement that the pair $[S_1,S_2]$ uniquely defines the cell group and frame timing, and at the same time also makes it possible to detect the cell group using only one S-SyS (i.e., only one member of the pair $[S_1,S_2]$).

Another aspect is the provision of methods and apparatuses that utilize the above-mentioned S-SyS sequences for cell group detection.

To facilitate a better understanding of the various aspects of the invention, the following description assumes an exemplary stage 2 process in the LTE cell search procedure; that is, cell group detection. However, the invention is not limited to this exemplary embodiment, but rather is applicable to any comparable radio communications environment.

Furthermore, the sequences described below can be defined and detected in both the time and frequency domains, and the exact sequences utilized (e.g., Hadamard, pn, Zadoff-Chu, M-sequences, etc.) are not limited by the invention.

To begin the discussion, assume that M unique cell groups are needed and that each cell group is uniquely associated with a pair of sequences $\tilde{S}_i, \tilde{S}_j$. Furthermore, taking 3G LTE as a non-limiting example, assume that the S-SyS symbols that are transmitted at two locations per frame 100 (e.g., in subframes 0 and 5, the first transmission within the frame being labeled $S_1$ and the second transmission within the frame being labeled $S_2$) are each created as a function of these sequences. That is, $S_1 = f_1(\tilde{S}_1, \tilde{S}_2)$ and $S_2 = f_2(\tilde{S}_1, \tilde{S}_2)$. The detection of at least one of these sequences should also give information about where subframe 0 is placed. The lowest number of sequences that provides all of the above information can be determined as follows: Let $N_{Seq}$ be the number of sequences needed to represent the M cell groups. The number of possible combinations of these sequences, taken two at a time, is given by the expression $N_{Seq} \cdot (N_{Seq}-1) \div 2$. The minimum value of $N_{Seq}$ that will allow M cell groups to be represented can then be found in accordance with:

$$\frac{N_{Seq} \cdot (N_{Seq}-1)}{2} = M \quad (1)$$

This leads to the following quadratic equation:

$$N_{Seq}^2 - N_{Seq} - 2M = 0 \quad (2)$$

Applying the well-known quadratic formula for finding the roots of a quadratic equation, one finds that the positive value of $N_{Seq}$ that satisfies the above requirements is given by:

$$N_{Seq} = \frac{1 + \sqrt{1+8M}}{2} \quad (3)$$

In practice, $N_{Seq}$ cannot be permitted to be a non-integer number, so the minimum acceptable integer value of $N_{Seq}$ is given by $$N_{Seq} = \text{ceil}\left(\frac{1 + \sqrt{1+8M}}{2}\right), \quad (4)$$

where ceil( ) is a function that rounds its argument up to the nearest integer.

Using the above in a simple example, suppose it is desired to represent M=340 different cell groups with unique combinations (pairings) of sequence values. The minimum number of sequences required in this instance is:

$$N_{Seq} = \text{ceil}\left(\frac{1+\sqrt{1+8\cdot 340}}{2}\right) = \text{ceil}\left(\frac{1+\sqrt{1+2720}}{2}\right) = 27. \quad (5)$$

A reason why it is desirable to minimize the number of sequences needed is to reduce the complexity of the processing required in the UE for detecting the cell group. FIGS. 2(*a*) and 2(*d*) illustrate a number of exemplary alternative ways of constructing the symbols $S_i$ ($1 \leq i \leq 2$) from $\tilde{S}_i, \tilde{S}_j$.

With reference to FIG. 2(*a*), a first exemplary embodiment involves transmitting, as the symbol $S_i$ associated with the particular cell group, the corresponding pair of sequences $\tilde{S}_i, \tilde{S}_j$ ($i \neq j$), with the order of the pair (in either the time or frequency domains) indicating whether the transmitted symbol is $S_1$ or $S_2$. The length of each of $\tilde{S}_i$ and $\tilde{S}_j$ is, in this example, half the length of $S_i$. (In theory, $\tilde{S}_i$ and $\tilde{S}_j$ need not be of equal length, but in practice they are chosen to be so.) For example, a time domain embodiment would include transmitting as the secondary synchronization signals $S_1 = \tilde{S}_i, \tilde{S}_j$ (i.e., first transmitting $\tilde{S}_i$ and then transmitting $\tilde{S}_j$) and $S_2 = \tilde{S}_j, \tilde{S}_i$ (i.e., first transmitting $\tilde{S}_j$ and then transmitting $\tilde{S}_i$) in each radio frame.

Alternatively, frequency domain embodiments applying the principle illustrated in FIG. 2(*a*) transmit the sequences $\tilde{S}_i$ and $\tilde{S}_j$ simultaneously, with for example, transmission of the symbol $S_1$ being performed by transmitting the sequence $\tilde{S}_i$ in a lower set of frequencies and the sequence $\tilde{S}_j$ being transmitted in a higher set of frequencies. Transmission of the symbol $S_2$ is the opposite, with the sequence $\tilde{S}_j$ being transmitted in the lower set of frequencies and the sequence $\tilde{S}_i$ being transmitted in the higher set of frequencies. This arrangement is illustrated in FIG. 2(*b*).

In other frequency domain embodiments applying the principle illustrated in FIG. 2(*a*) the sequences $\tilde{S}_i$ and $\tilde{S}_j$ are transmitted simultaneously by means of interleaving. For example, given two sets of frequencies that are interleaved with one another, transmission of the symbol SI can be performed by transmitting the sequence $\tilde{S}_i$ in a "lower" one of the sets of interleaved frequencies and transmitting the sequence $\tilde{S}_j$ in a "higher" one of the sets of frequencies. (Here, the words "higher" and "lower" do not refer to the sets of frequencies as a single contiguous group, but rather to pairs of resource elements associated with the interleaved frequencies, so that one resource element associated with $\tilde{S}_i$ is on a lower frequency than the neighboring resource element associated with $\tilde{S}_j$.) Transmission of the symbol $S_2$ is the opposite, with the sequence $\tilde{S}_j$ being transmitted in a lower one of the sets of frequencies and the sequence $\tilde{S}_i$ being transmitted a higher one of the sets of frequencies. This arrangement is illustrated in FIG. 2(c).

In either case (i.e., time domain embodiment or frequency domain embodiment), the detector (UE) preferably includes a look-up table that associates each sequence pair and ordering with a cell group identifier and frame timing information (i.e., whether the ordering of the sequence pair indicates sub-frame 0 or sub-frame 5), so that the detector can easily identify the cell group and frame timing.

Figure 2A:
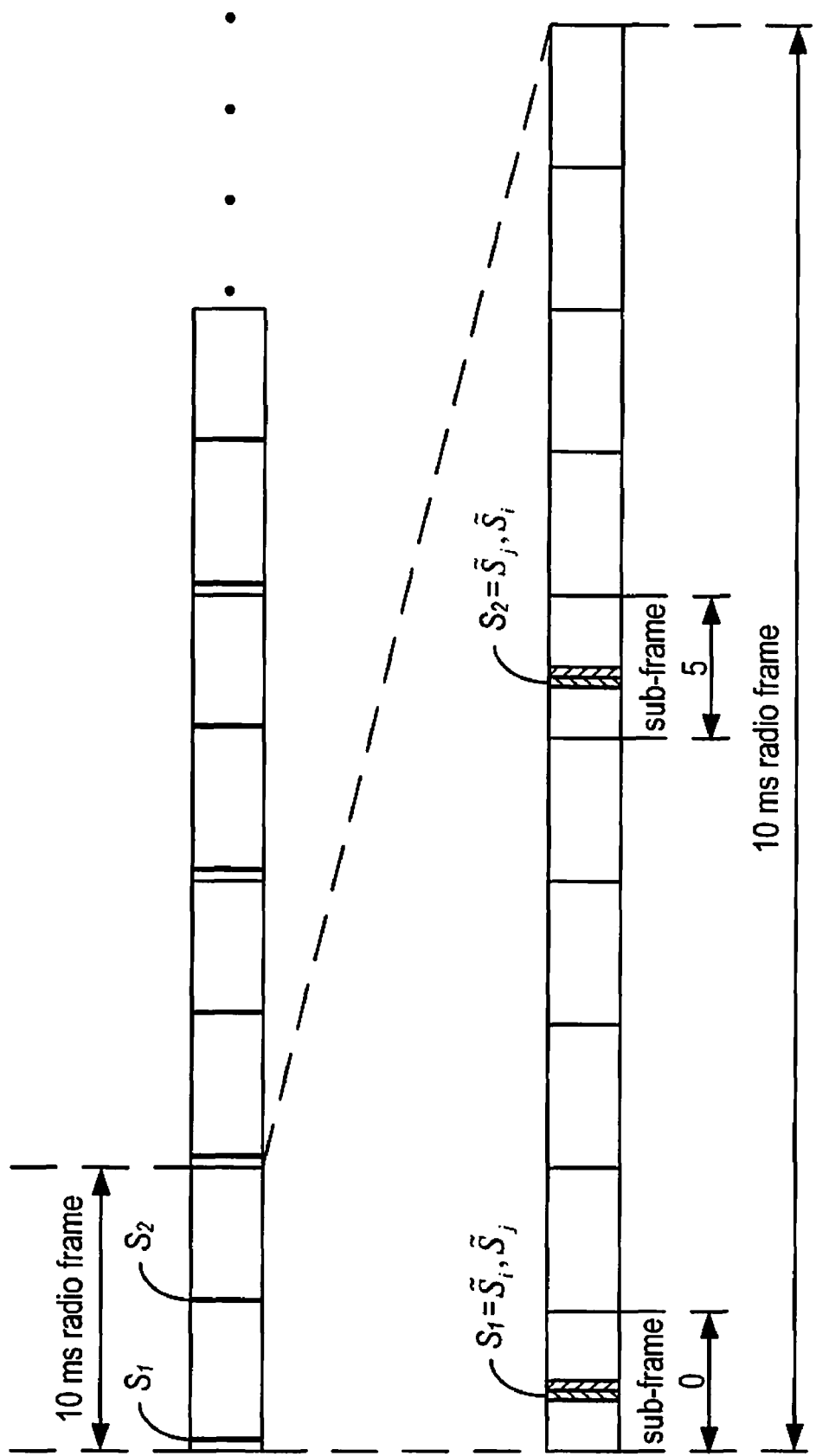
FIGS. 2(a) and 2(d) illustrate a number of exemplary alternative ways of constructing the symbols $S_i$ ($1 \leq i \leq 2$) from sequences $\tilde{S}_i, \tilde{S}_j$ in accordance with an aspect of embodiments consistent with the invention.
Figure 2B:
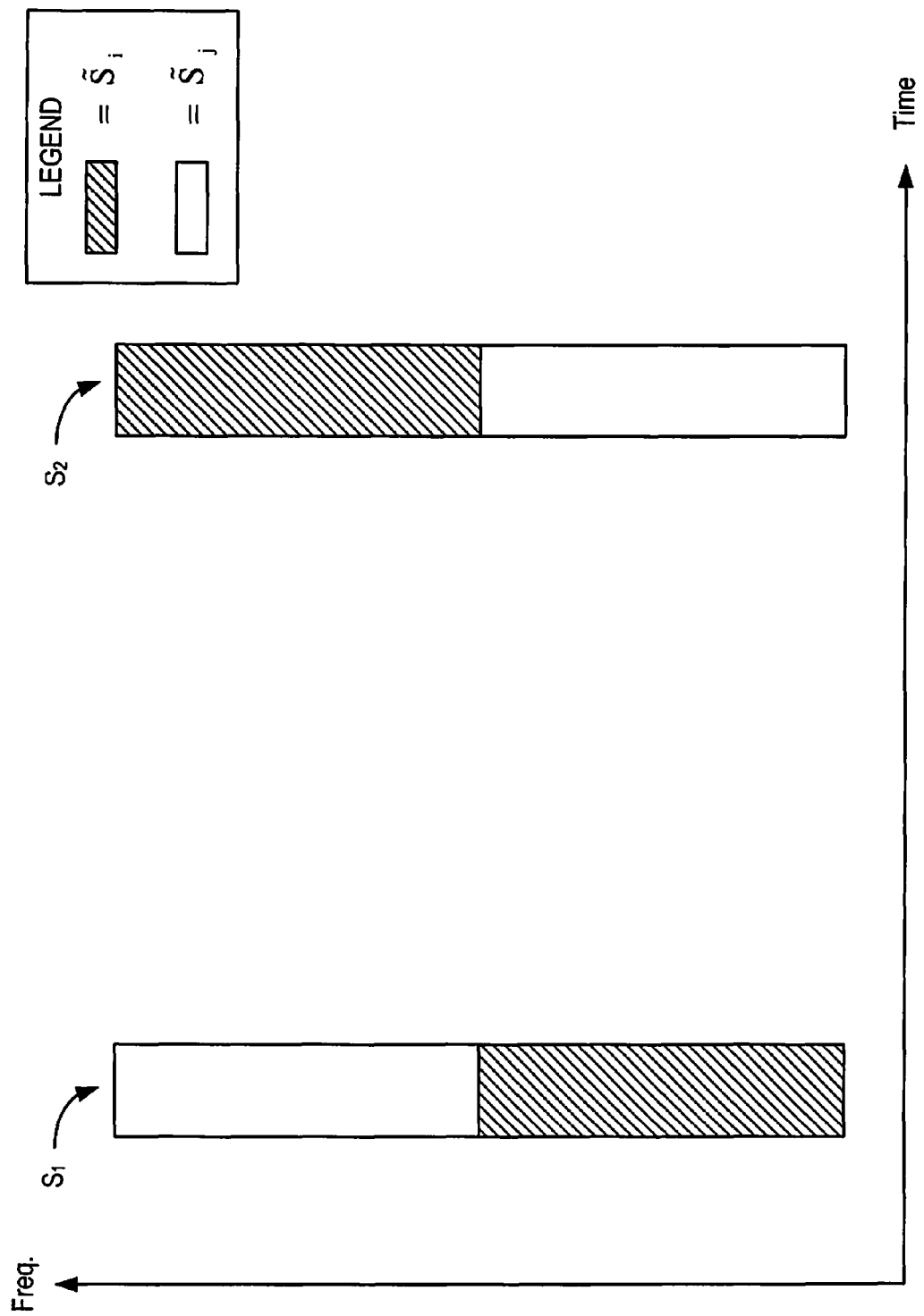
FIGS. 2(b) and 2(c) show alternative arrangements in the frequency domain of sub-sequences that make up each of the SyS sequences S1 and S2 in accordance with an aspect of alternative embodiments consistent with the invention.
Figure 2C:
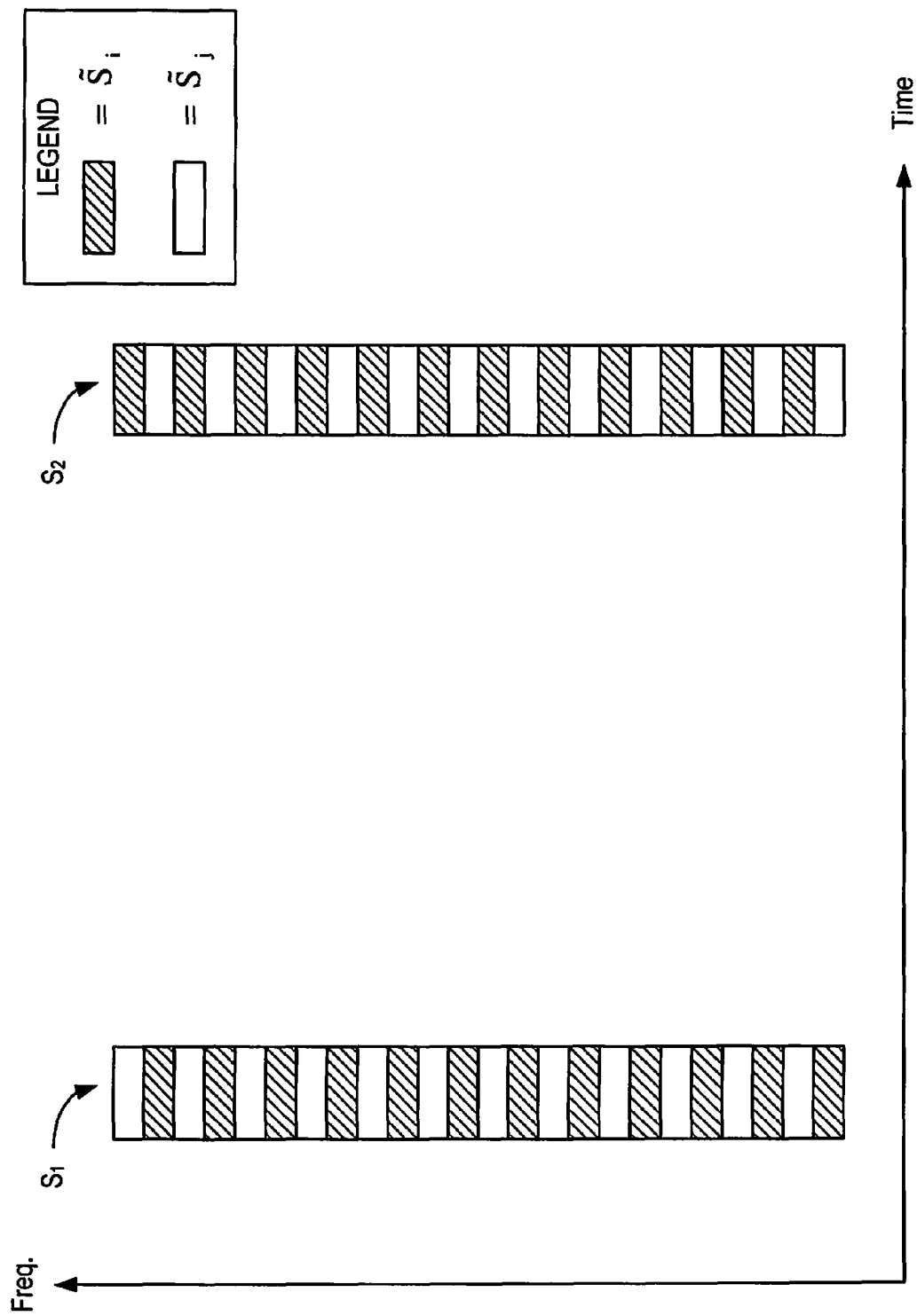
Figure 2D:
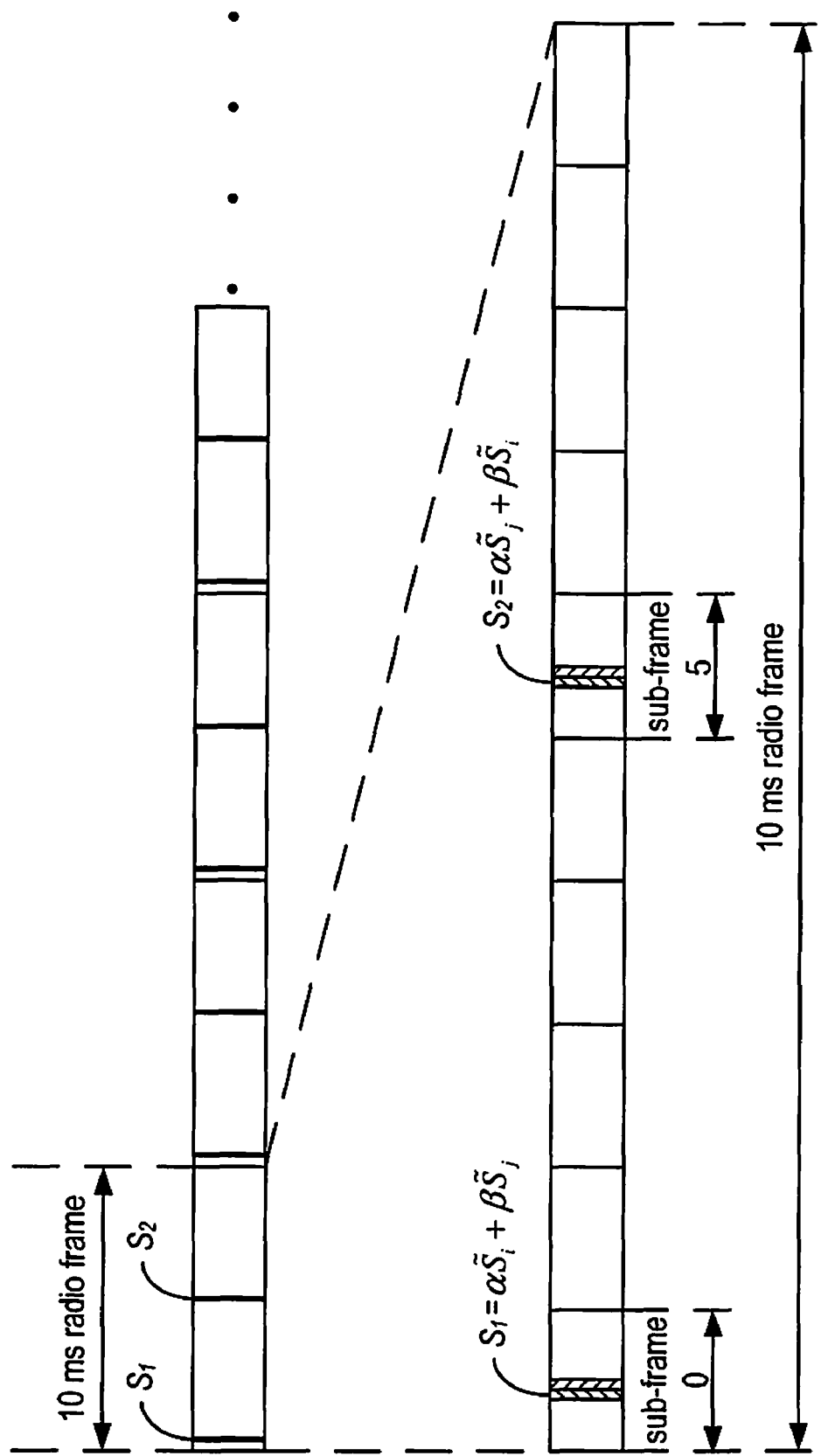

With reference to FIG. 2(d), another exemplary alternative embodiment involves generating each symbol $S_i$ as a weighted sum of the sequence pair $\tilde{S}_i, \tilde{S}_j$ (i≠j), with each particular pairing being uniquely associated with one of the M cell groups. Furthermore, the amount of weighting applied to each of the sequences indicates whether the sequence pair is being transmitted in sub-frame 0 ($S_1$) or in sub-frame 5 ($S_2$). That is, the secondary synchronization symbols for each radio frame can be represented as follows:

$$S_1 = \alpha \tilde{S}_i + \beta \tilde{S}_j \text{ (for sub-frame \textbf{0})}$$

$$S_1 = \beta \tilde{S}_i + \alpha \tilde{S}_j \text{ (for sub-frame \textbf{5})} \quad (6)$$

In such embodiments, the length of each sequence $\tilde{S}_i, \tilde{S}_j$ can be the same as the length of the symbol $S_i$, and both sequences are transmitted at the same time. The different weightings ($\alpha$ and $\beta$, with $\alpha \neq \beta$) that indicate in which sub-frame the symbol is being transmitted can be achieved by transmitting the sequences at different amplitudes and/or powers relative to one another.

In this embodiment, the detector (UE) preferably includes a look-up table that associates each sequence pair and relative weighting of the sequences (e.g., as indicated by signal amplitude and/or power) with a cell group identifier and frame timing information (i.e., whether the applied multiplicands $\alpha$ and $\beta$ indicate sub-frame 0 or sub-frame 5), so that the detector can easily identify the cell group and frame timing. In alternative embodiments, a logic circuit associates each sequence pair and relative weighting of the sequences with a cell group identifier and frame timing information, so that the detector can easily identify the cell group and frame timing.

One possibility for constructing the multiplicands $\alpha$ and $\beta$ is to interpret them as diagonal matrices, that is:

$$\alpha = \begin{bmatrix} \alpha_1 & & & \\ & \alpha_2 & & \\ & & \ddots & \\ & & & \alpha_N \end{bmatrix} \quad (7)$$

Hence, $S_1 = \alpha \tilde{S}_i + \beta \tilde{S}_j$ can be interpreted as element-wise multiplication, that is:

$$S_{1,k} = \alpha_k \tilde{S}_{i,k} + \beta_k \tilde{S}_{j,k}, \quad (8)$$

wherein k is the kth element of the vector.

An alternative way to construct the multiplicands $\alpha$ and $\beta$ is to allow $\beta$ to be a function of the sequence in front of $\alpha$ in the formula for $S_1$, that is:

$$S_1 = \alpha \tilde{S}_i + \beta(\tilde{S}_i) \tilde{S}_j \text{ (for sub-frame \textbf{0})}$$

$$S_2 = \beta(\tilde{S}_j) \tilde{S}_i + \alpha \tilde{S}_j \text{ (for sub-frame \textbf{5})}. \quad (9)$$

In this embodiment, the UE should first correlate to the sequence $\tilde{S}_i$ and detect that one. Then, based on the detected $\tilde{S}_i$ sequence, the UE looks in, for example, a look-up table to determine the $\beta$ sequence, and then correlates and detects the $\tilde{S}_j$ sequence.

Yet another alternative is similar to the one just described, but instead allows $\alpha$ to be a function of the sequence in front of $\beta$.

It will be appreciated that various embodiments can be implemented in OFDM as well as non-OFDM environments. In an OFDM system, for example, a first ordering of the pair of sequences, $\tilde{S}_i, \tilde{S}_j$ can be effected by transmitting the sequence $\tilde{S}_i$ on a first set of one or more sub-carriers, and transmitting the sequence $\tilde{S}_j$ on a second set of one or more sub-carriers. A second ordering of the pair of sequences, $\tilde{S}_i, \tilde{S}_j$ can be effected by transmitting the sequence $\tilde{S}_j$ on the first set of one or more sub-carriers, and transmitting the sequence $\tilde{S}_i$ on the second set of one or more sub-carriers.

In a non-OFDM environment, the physical layer of the cellular communication system can still involve the symbols of the synchronization signal, $S_1$, being separated in a frequency domain. In such embodiments, the first ordering of the pair of sequences, $\tilde{S}_i, \tilde{S}_j$ can be effected by transmitting the sequence $\tilde{S}_i$ on a first set of frequencies, and transmitting the sequence $\tilde{S}_j$ on a second set of frequencies. The second ordering of the pair of sequences, $\tilde{S}_i, \tilde{S}_j$ can be effected by transmitting the sequence $\tilde{S}_j$ on the first set of frequencies, and transmitting the sequence $\tilde{S}_i$ on the second set of frequencies.

Figure 3:
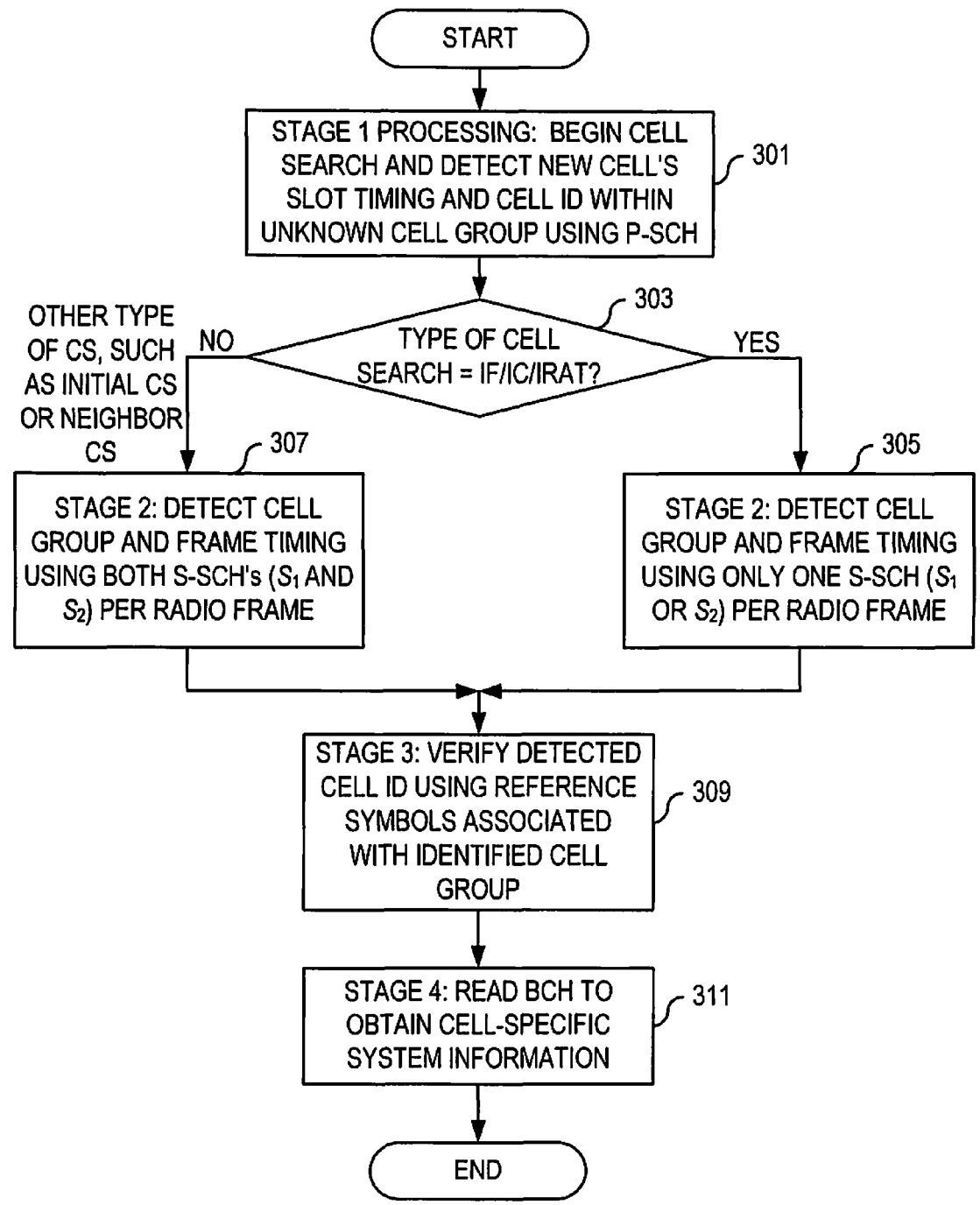
FIG. 3 is a flow chart of exemplary processes/steps performed by circuitry in a UE for utilizing the inventive secondary synchronization symbols to determine cell group and frame timing in accordance with other embodiments consistent with the invention.

FIG. 3 is a flow chart of exemplary processes/steps performed by circuitry in a UE (e.g., a detector) for utilizing the above-described secondary synchronization symbols to determine cell group and frame timing in accordance with embodiments consistent with the invention. The various blocks shown in FIG. 3 can also be considered to represent the UE's logic configured to perform the indicated function.

The UE begins by performing stage 1 processing, which includes beginning the cell search and detecting a newly found cell's slot timing (e.g., 5 ms timing) and cell ID within an unknown cell group using the P-SyS signals received on the P-SCH (step 301). Techniques for performing this step are well-known, and beyond the scope of the invention.

The UE is now ready to perform stage 2 processing. However, in accordance with an aspect of embodiments consistent with the invention, the type of cell search being performed will determine whether both $S_1$ and $S_2$ are used, or whether just one of these is used. More particularly, there are a number of different types of cell searches (e.g., initial cell search, neighbor cell search, inter-frequency cell search, and inter-radio access technology cell search), and each performs stage 2 processing to detect frame timing and to identify a cell's cell group. The cell search procedures are essentially the same for the different types, but there are some differences. For example, for an intra-frequency cell search the UE can perform cell searching simultaneously with data reception from the serving cell. However, for inter-frequency or inter-radio access technology cell searches (e.g., camping on a GSM system and performing cell search on an LTE system carrier) the UE must interrupt its data reception from the serving cell when changing carrier frequencies for the cell search. In order to reduce the interruption length (i.e., interruption in data reception), one wants to be able to detect all cell information in one synchronization frame. This eliminates the possibility of accumulating cell search information over a number of synchronization frames and therefore results in inter-frequency and inter-radio access technology cell searches having worse performance than intra-frequency cell searches. To accommodate this, networks are typically planned to tolerate slower cell searching for the inter-frequency and inter-radio access technology cell searching than for intra-frequency cell searching.

As to initial cell search procedures, the frequency error can be large. This creates a need to perform a frequency error correction step, typically between stages 1 and 2. Initial cell search performance is typically not as good as that of neighbor cell searching, but initial cell search is performed only when the UE is turned on, so it does not seriously affect the UE's overall performance.

Returning now to a discussion of FIG. 3, if it is determined that the type of cell search being performed is an inter-frequency ("IF"), inter-cell ("IC") or inter-radio access technology (IRAT) cell search ("YES" path out of decision block 303), stage 2 processing is invoked that uses only one S-SyS (either $S_1$ or $S_2$) per radio frame to detect cell group and frame timing (step 305). The sequence pair $\tilde{S}_i, \tilde{S}_j$ maximizing the correlation power is chosen as an indicator of the detected cell group. Depending on which embodiment is implemented, the specific order of the sequences or alternatively the power relation order of $\tilde{S}_i, \tilde{S}_j$ determines the frame timing (e.g., the 10 ms timing in an LTE system).

However, if it is determined that the type of cell search being performed is not an inter-frequency, inter-cell, or inter-radio access technology cell search ("NO" path out of decision block 303), this means that the UE is performing a cell search that requires a more accurate determination of frame timing and cell group, such as an initial cell search or a neighbor cell search. Consequently, stage 2 processing is invoked that uses both S-SySs (i.e., both $S_1$ and $S_2$) per radio frame to detect cell group and frame timing (step 307).

The results obtained from stage 2 processing (either step 305 or step 307) are then used in the usual way to facilitate stage 3 processing. In some embodiments, this can include verifying the cell ID obtained from earlier processing by using reference symbols associated with the identified cell group (step 309). That is, the reference symbols used for cell ID detection are descrambled using the scrambling code determined by the cell group and cell ID.

To complete the example, FIG. 3 also shows that stage 4 processing (i.e., reading the BCH to obtain cell-specific system information) is also performed. However, neither stage 3 nor stage 4 processing are an essential aspect of the invention, and are therefore not described here in great detail.

The invention has been described with reference to particular embodiments. However, it will be readily apparent to those skilled in the art that it is possible to embody the invention in specific forms other than those of the embodiment described above. The described embodiments are merely illustrative and should not be considered restrictive in any way. The scope of the invention is given by the appended claims, rather than the preceding description, and all variations and equivalents which fall within the range of the claims are intended to be embraced therein.

The invention claimed is:

1. A method of indicating timing parameters and an identity of a particular cell group from a number, M, of possible cell groups in a signal transmitted in a cellular communication system that employs a radio frame in a physical layer, the radio frame comprising a number of time slots, the method comprising:
    transmitting, in a known one of the time slots of the radio frame, a synchronization signal, $S_1$, that comprises a pair of sequences, $\tilde{S}_i, \tilde{S}_j$ arranged in a first ordering; and
    transmitting, in another known one of the time slots of the radio frame, a synchronization signal, $S_2$, that comprises the pair of sequences, $\tilde{S}_i, \tilde{S}_j$ arranged in a second ordering,
    wherein:
    each member of the pair of sequences, $\tilde{S}_i, \tilde{S}_j$ is selected from a group comprising $N_{seq}$ different sequences, wherein $N_{seq}$ is at least ceil $$\left( \frac{1 + \sqrt{1+8M}}{2} \right)$$

different sequences;
    the selected pair of sequences is uniquely identified with the particular cell group, wherein $i, j \in [1, \ldots, N_{seq}]$ and $\tilde{S}_i \neq \tilde{S}_j$; and
    the first ordering of the sequences is used only for transmission in the known one of the time slots of the radio frame, and the second ordering of the sequences is used only for transmission in said another known one of the time slots.

2. The method of claim 1, wherein:
    the physical layer of the cellular communication system employs Orthogonal Frequency Division Multiplexing;
    the first ordering of the pair of sequences, $\tilde{S}_i, \tilde{S}_j$ is effected by transmitting the sequence $\tilde{S}_i$ on a first set of one or more sub-carriers, and transmitting the sequence $\tilde{S}_j$ on a second set of one or more sub-carriers; and
    the second ordering of the pair of sequences, $\tilde{S}_i, \tilde{S}_j$ is effected by transmitting the sequence $\tilde{S}_j$ on the first set of one or more sub-carriers, and transmitting the sequence $\tilde{S}_i$ on the second set of one or more sub-carriers.

3. The method of claim 1, wherein:
    in the physical layer of the cellular communication system, symbols of the synchronization signal, $S_1$, are separated in a frequency domain;
    the first ordering of the pair of sequences, $\tilde{S}_i, \tilde{S}_j$ is effected by transmitting the sequence $\tilde{S}_i$ on a first set of frequencies, and transmitting the sequence $\tilde{S}_j$ on a second set of frequencies; and
    the second ordering of the pair of sequences, $\tilde{S}_i, \tilde{S}_j$ is effected by transmitting the sequence $\tilde{S}_j$ on the first set of frequencies, and transmitting the sequence $\tilde{S}_i$ on the second set of frequencies.

4. The method of claim 1, wherein the use of the first ordering of the sequences only for transmission in the known one of the time slots of the radio frame, and the use of the second ordering of the sequences only for transmission in said another known one of the time slots enables detection of radio frame timing using just one of the synchronization signals, $S_1$ and $S_2$.

5. A method of detecting timing parameters and an identity of a particular cell group from a number, M, of possible cell groups in a signal received in a cellular communication system that employs a radio frame in a physical layer, the radio frame comprising a number of time slots including two time slots associated with a synchronization channel, the method comprising:
    receiving, in one of the time slots associated with the synchronization channel, one of first and second synchronization signals, $S_1$ and $S_2$, wherein the first synchronization signal $S_1$ comprises a pair of sequences, $\tilde{S}_i, \tilde{S}_j$ arranged in a first ordering and the second synchronization signal $S_2$ comprises the pair of sequences, $\tilde{S}_i, \tilde{S}_j$ arranged in a second ordering;

determining which of a number of predefined sequences best matches the received sequence $\tilde{S}_i$, which of the number of predefined sequences best matches the received sequence $\tilde{S}_j$, and whether the pair of received sequences $\tilde{S}_i$, $\tilde{S}_j$ were arranged in the first ordering or the second ordering, wherein the number of predefined sequences is selected from a group comprising $N_{seq}$ different sequences, wherein $N_{seq}$ is at least ceil $$\left( \frac{1 + \sqrt{1 + 8M}}{2} \right)$$

different sequences;

identifying the particular cell group by performing a cell group identification process that includes determining with which cell group the pair of received sequences, $\tilde{S}_i$, $\tilde{S}_j$, is uniquely associated; and determining in which one of the two time slots associated with the synchronization channel the one of first and second synchronization signals was received by using information that indicates whether the sequences $\tilde{S}_i$, $\tilde{S}_j$ were received in the first ordering or the second ordering.

6. The method of claim 5, wherein:

the physical layer of the cellular communication system employs Orthogonal Frequency Division Multiplexing;

the first ordering of the pair of sequences, $\tilde{S}_i$, $\tilde{S}_j$ causes the sequence $\tilde{S}_i$ to be received on a first set of one or more sub-carriers, and the sequence $\tilde{S}_j$ to be received on a second set of one or more sub-carriers; and the second ordering of the pair of sequences, $\tilde{S}_i$, $\tilde{S}_j$ causes the sequence $\tilde{S}_j$ to be received on the first set of one or more sub-carriers, and the sequence $\tilde{S}_i$ to be received on the second set of one or more sub-carriers.

7. The method of claim 6, wherein the first and second synchronization signals, $S_1$ and $S_2$, and the sequences and $\tilde{S}_i$ and $\tilde{S}_j$ are all of equal length.

8. The method of claim 5, wherein:

in the physical layer of the cellular communication system, symbols of the synchronization signal, $S_1$, are separated in a frequency domain;

the first ordering of the pair of sequences, $\tilde{S}_i$, $\tilde{S}_j$ causes the sequence $\tilde{S}_i$ to be received on a first set of frequencies, and the sequence $\tilde{S}_j$ to be received on a second set of frequencies; and the second ordering of the pair of sequences, $\tilde{S}_i$, $\tilde{S}_j$ causes the sequence $\tilde{S}_j$ to be received on the first set of frequencies, and the sequence $\tilde{S}_i$ to be received on the second set of frequencies.

9. The method of claim 5, wherein receiving, in one of the time slots associated with the synchronization channel, one of the first and second synchronization signals $S_1$ and $s_2$ comprises:

receiving the pair of sequences $\tilde{S}_i$, $\tilde{S}_j$ simultaneously.

10. The method of claim 5, comprising:

detecting radio frame timing by using information that indicates in which one of the two time slots associated with the synchronization channel the one of the first and second synchronization signals was received.

11. The method of claim 5, wherein identifying the particular cell group by determining with which cell group the pair of received sequences, $\tilde{S}_i$, $\tilde{S}_j$, is uniquely associated comprises using the pair of received sequences $\tilde{S}_i$, $\tilde{S}_j$ to locate an entry in a look-up table.

12. The method of claim 5, wherein identifying the particular cell group by determining with which cell group the pair of received sequences, $\tilde{S}_i$, $\tilde{S}_j$, is uniquely associated is performed by calculation circuitry.

13. The method of claim 5, wherein using information about whether the sequences $\tilde{S}_i$, $\tilde{S}_j$ were arranged in the first ordering or the second ordering to determine in which one of the two time slots associated with the synchronization channel the received one of the first and second synchronization signals was received comprises using the pair of received sequences $\tilde{S}_i$, $\tilde{S}_j$ to locate an entry in a look-up table.

14. The method of claim 5, wherein using information about whether the sequences $\tilde{S}_i$, $\tilde{S}_j$ were arranged in the first ordering or the second ordering to determine in which one of the two time slots associated with the synchronization channel the received one of the first and second synchronization signals was received is performed by calculation circuitry.

15. The method of claim 5, comprising:

receiving, in an other one of the time slots associated with the synchronization channel, an other one of the first and second synchronization signals;

determining whether a type of cell search procedure to be performed is an inter-frequency cell search procedure;

determining whether the type of cell search procedure to be performed is an inter-radio access technology cell search procedure;

determining whether the type of cell search procedure to be performed is an intra-cell search procedure;

if the type of cell search procedure to be performed is none of the inter-frequency cell search procedure, the inter-radio access technology cell search procedure, or the intra-cell search procedure, then performing:

determining which of the number of predefined sequences best matches the received sequence $\tilde{S}_i$ of the other one of the first and second synchronization signals, which of the number of predefined sequences best matches the received sequence $\tilde{S}_j$ of the other one of the first and second synchronization signals, and whether the pair of received sequences $\tilde{S}_i$, $\tilde{S}_j$ of the other one of the first and second synchronization signals were arranged in the first ordering or the second ordering, wherein the cell group identification process further includes determining with which cell group the pair of received sequences, $\tilde{S}_i$, $\tilde{S}_j$, of the other one of the first and second synchronization signals is uniquely associated.

16. An apparatus for indicating timing parameters and an identity of a particular cell group from a number, M, of possible cell groups in a signal transmitted in a cellular communication system that employs a radio frame in a physical layer, the radio frame comprising a number of time slots, the apparatus comprising:

circuit operable to transmit, in a known one of the time slots of the radio frame, a synchronization signal, $S_1$, that comprises a pair of sequences, $\tilde{S}_i$, $\tilde{S}_j$ arranged in a first ordering; and circuit operable to transmit, in another known one of the time slots of the radio frame, a synchronization signal, $S_2$, that comprises the pair of sequences, $\tilde{S}_i$, $\tilde{S}_j$ arranged in a second ordering, wherein:

each member of the pair of sequences, $\tilde{S}_i$, $\tilde{S}_j$, is selected from a group comprising $N_{seq}$ different sequences, wherein $N_{seq}$ is at least ceil $$\left(\frac{1+\sqrt{1+8M}}{2}\right)$$

different sequences;
the selected pair of sequences is uniquely identified with the particular cell group, wherein i, j ∈[1, . . . ,$N_{seq}$] and $\tilde{S}_i \neq \tilde{S}_j$; and
the apparatus is operable to operate such that the first ordering of the sequences is used only for transmission in the known one of the time slots of the radio frame, and the second ordering of the sequences is used only for transmission in said another known one of the time slots.

17. The apparatus of claim 16, wherein:
the physical layer of the cellular communication system employs Orthogonal Frequency Division Multiplexing;
the circuit operable to transmit, in the known one of the time slots of the radio frame, the synchronization signal, $S_1$, that comprises the pair of sequences, $\tilde{S}_i$, $\tilde{S}_j$ arranged in the first ordering effects the first ordering of the pair of sequences, $\tilde{S}_i$, $\tilde{S}_j$ by transmitting the sequence $\tilde{S}_i$ on a first set of one or more sub-carriers, and transmitting the sequence $\tilde{S}_j$ on a second set of one or more sub-carriers; and
the circuit operable to transmit, in said another known one of the time slots of the radio frame, the synchronization signal, $S_2$, that comprises the pair of sequences, $\tilde{S}_i$, $\tilde{S}_j$ arranged in the second ordering effects the second ordering of the pair of sequences, $\tilde{S}_i$, $\tilde{S}_j$ by transmitting the sequence $\tilde{S}_j$ the first set of one or more sub-carriers, and transmitting the sequence $\tilde{S}_i$ on the second set of one or more sub-carriers.

18. The apparatus of claim 17, wherein the first and second synchronization signals, $S_1$ and $S_2$, and the sequences $\tilde{S}_i$ and $\tilde{S}_j$ are all of equal length.

19. The apparatus of claim 16, wherein:
in the physical layer of the cellular communication system, symbols of the synchronization signal, $S_1$, are separated in a frequency domain;
the circuit operable to transmit, in the known one of the time slots of the radio frame, the synchronization signal, $S_1$, that comprises the pair of sequences, $\tilde{S}_i$, $\tilde{S}_j$ arranged in the first ordering effects the first ordering of the pair of sequences, $\tilde{S}_i$, $\tilde{S}_j$ by transmitting the sequence $\tilde{S}_i$ on a first set of frequencies, and transmitting the sequence $\tilde{S}_j$ on a second set of frequencies; and
the circuit operable to transmit, in said another known one of the time slots of the radio frame, the synchronization signal, $S_2$, that comprises the pair of sequences, $\tilde{S}_i$, $\tilde{S}_j$ arranged in the second ordering effects the second ordering of the pair of sequences, $\tilde{S}_i$, $\tilde{S}_j$ by transmitting the sequence $\tilde{S}_j$ on the first set of frequencies, and transmitting the sequence $\tilde{S}_i$ on the second set of frequencies.

20. The apparatus of claim 16, wherein the use of the first ordering of the sequences only for transmission in the known one of the time slots of the radio frame, and the use of the second ordering of the sequences only for transmission in said another known one of the time slots enables detection of radio frame timing using just one of the synchronization signals, $S_1$ and $S_2$.

21. An apparatus for detecting timing parameters and an identity of a particular cell group from a number, M, of possible cell groups in a signal received in a cellular communication system that employs a radio frame in a physical layer, the radio frame comprising a number of time slots including two time slots associated with a synchronization channel, the apparatus comprising:
circuit operable to receive, in one of the time slots associated with the synchronization channel, one of first and second synchronization signals, $S_1$ and $S_2$, wherein the first synchronization signal $S_1$ comprises a pair of sequences, $\tilde{S}_i$, $\tilde{S}_j$ arranged in a first ordering and the second synchronization signal $S_2$ comprises the pair of sequences, $\tilde{S}_i$, $\tilde{S}_j$ arranged in a second ordering;
circuit operable to determine which of a number of predefined sequences best matches the received sequence $\tilde{S}_i$, which of the number of predefined sequences best matches the received sequence $\tilde{S}_j$, and whether the pair of received sequences $\tilde{S}_i$, $\tilde{S}_j$ were arranged in the first ordering or the second ordering, wherein the number of predefined sequences is selected from a group comprising $N_{seq}$ different sequences, wherein $N_{seq}$ is at least ceil $$\left(\frac{1+\sqrt{1+8M}}{2}\right)$$

different sequences;
circuit operable to identify the particular cell group by performing a cell group identification process that includes determining with which cell group the pair of received sequences, $\tilde{S}_i$, $\tilde{S}_j$, is uniquely associated; and
circuit operable to determine in which one of the two time slots associated with the synchronization channel the one of first and second synchronization signals was received by using information that indicates whether the sequences $\tilde{S}_i$, $\tilde{S}_j$ were received in the first ordering or the second ordering.

22. The apparatus of claim 21, wherein:
the physical layer of the cellular communication system employs Orthogonal Frequency Division Multiplexing;
the first ordering of the pair of sequences, $\tilde{S}_i$, $\tilde{S}_j$ causes the sequence $\tilde{S}_i$ to be received on a first set of one or more sub-carriers, and the sequence $\tilde{S}_j$ to be received on a second set of one or more sub-carriers; and
the second ordering of the pair of sequences, $\tilde{S}_i$, $\tilde{S}_j$ causes the sequence $\tilde{S}_j$ to be received on the first set of one or more sub-carriers, and the sequence $\tilde{S}_i$ to be received on the second set of one or more sub-carriers.

23. The apparatus of claim 22, wherein the first and second synchronization signals, $S_1$ and $S_2$, and the sequences $\tilde{S}_i$ and $\tilde{S}_j$ are all of equal length.

24. The apparatus of claim 21, wherein:
in the physical layer of the cellular communication system, symbols of the synchronization signal, $S_1$, are separated in a frequency domain;
the first ordering of the pair of sequences, $\tilde{S}_i$, $\tilde{S}_j$ causes the sequence $\tilde{S}_i$ to be received on a first set of frequencies, and the sequence $\tilde{S}_j$ to be received on a second set of frequencies; and
the second ordering of the pair of sequences, $\tilde{S}_i$, $\tilde{S}_j$ causes the sequence $\tilde{S}_j$ to be received on the first set of frequencies, and the sequence $\tilde{S}_i$ to be received on the second set of frequencies.

25. The apparatus of claim 21, wherein the circuit operable to receive, in one of the time slots associated with the synchronization channel, one of the first and second synchronization signals $S_1$ and $S_2$ comprises:

circuit operable to receive the pair of sequences $\tilde{S}_i$, $\tilde{S}_j$ simultaneously.

26. The apparatus of claim 21, comprising:
circuit operable to detect radio frame timing by using information that indicates in which one of the two time slots associated with the synchronization channel the one of the first and second synchronization signals was received.

27. The apparatus of claim 21, wherein the circuit operable to identify the particular cell group by determining with which cell group the pair of received sequences, $\tilde{S}_i$, $\tilde{S}_j$, is uniquely associated comprises circuit operable to use the pair of received sequences $\tilde{S}_i$, $\tilde{S}_j$ to locate an entry in a look-up table.

28. The apparatus of claim 21, wherein the circuit operable to identify the particular cell group by determining with which cell group the pair of received sequences, $\tilde{S}_i$, $\tilde{S}_j$, is uniquely associated comprises calculation circuitry.

29. The apparatus of claim 21, wherein the circuit operable to determine in which one of the two time slots associated with the synchronization channel the one of first and second synchronization signals was received by using information that indicates whether the sequences $\tilde{S}_i$, $\tilde{S}_j$ were received in the first ordering or the second ordering comprises:
  a look-up table; and
  circuit operable to use the pair of received sequences $\tilde{S}_i$, $\tilde{S}_j$ to locate an entry in the look-up table.

30. The apparatus of claim 21, wherein the circuit operable to determine in which one of the two time slots associated with the synchronization channel the one of first and second synchronization signals was received by using information that indicates whether the sequences $\tilde{S}_i$, $\tilde{S}_j$ were received in the first ordering or the second ordering comprises:
calculation circuitry that takes as input the pair of received sequences $\tilde{S}_i$, $\tilde{S}_j$.

31. The apparatus of claim 21, comprising:
circuit operable to receive, in an other one of the time slots associated with the synchronization channel, an other one of the first and second synchronization signals;
circuit operable to determine whether a type of cell search procedure to be performed is an inter-frequency cell search procedure;
circuit operable to determine whether the type of cell search procedure to be performed is an inter-radio access technology cell search procedure;
circuit operable to determine whether the type of cell search procedure to be performed is an intra-cell search procedure;
circuit operable to respond to the type of cell search procedure to be performed being none of the inter-frequency cell search procedure, the inter-radio access technology cell search procedure, or the intra-cell search procedure, by performing:
  determining which of the number of predefined sequences best matches the received sequence $\tilde{S}_i$ of the other one of the first and second synchronization signals, which of the number of predefined sequences best matches the received sequence $\tilde{S}_j$ of the other one of the first and second synchronization signals, and whether the pair of received sequences $\tilde{S}_i$, $\tilde{S}_j$ of the other one of the first and second synchronization signals were arranged in the first ordering or the second ordering,
wherein the cell group identification process further includes determining with which cell group the pair of received sequences, $\tilde{S}_i$, $\tilde{S}_j$ of the other one of the first and second synchronization signals is uniquely associated.

* * * * *

UNITED STATES PATENT AND TRADEMARK OFFICE
CERTIFICATE OF CORRECTION

| | | |
|---|---|---|
| PATENT NO. | : 7,961,709 B2 | Page 1 of 1 |
| APPLICATION NO. | : 12/522166 | |
| DATED | : June 14, 2011 | |
| INVENTOR(S) | : Lindoff et al. | |

It is certified that error appears in the above-identified patent and that said Letters Patent is hereby corrected as shown below:

In Column 6, Line 58, delete "SI" and insert -- $S_1$ --, therefor.

In Column 10, Line 34, in Claim 2, delete " $\tilde{S}_j$ " and insert -- $\tilde{S}_i$ --, therefor.

In Column 11, Line 55, in Claim 9, delete "$s_2$" and insert -- $S_2$ --, therefor.

In Column 13, Line 35, in Claim 17, delete " $\tilde{S}_i$ " and insert -- $\tilde{S}_j$ --, therefor.

In Column 14, Line 61, in Claim 24, delete " $\tilde{S}_i$ " and insert -- $\tilde{S}_j$ --, therefor.

Signed and Sealed this
Twenty-fourth Day of January, 2012

David J. Kappos
*Director of the United States Patent and Trademark Office*